(12) United States Patent
Elshafie et al.

(10) Patent No.: US 12,279,248 B2
(45) Date of Patent: Apr. 15, 2025

(54) FEEDBACK DESIGNS FOR SIDELINK SUB-SLOTS

(71) Applicant: QUALCOMM Incorporated, San Diego, CA (US)

(72) Inventors: Ahmed Elshafie, San Diego, CA (US); Wei Yang, San Diego, CA (US); Seyedkianoush Hosseini, San Diego, CA (US); Tugcan Aktas, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 170 days.

(21) Appl. No.: 17/522,627

(22) Filed: Nov. 9, 2021

(65) Prior Publication Data
US 2023/0148410 A1    May 11, 2023

(51) Int. Cl.
*H04W 72/02* (2009.01)
*H04W 72/1263* (2023.01)

(52) U.S. Cl.
CPC ....... *H04W 72/1263* (2013.01); *H04W 72/02* (2013.01)

(58) Field of Classification Search
CPC .............. H04W 72/02; H04W 72/1263; H04L 1/1896; H04L 5/0055; H04L 1/0025
See application file for complete search history.

(56) References Cited

U.S. PATENT DOCUMENTS

| 2021/0288778 A1* | 9/2021 | Park | H04L 1/1812 |
| 2021/0289529 A1* | 9/2021 | Hosseini | H04W 72/20 |
| 2022/0311582 A1* | 9/2022 | Ye | H04L 1/1812 |

FOREIGN PATENT DOCUMENTS

WO    WO-2021040585 A1    3/2021

OTHER PUBLICATIONS

International Search Report and Written Opinion—PCT/US2022/078090—ISA/EPO—Jan. 3, 2023 (2105181WO).

* cited by examiner

*Primary Examiner* — Sulaiman Nooristany
(74) *Attorney, Agent, or Firm* — Holland & Hart LLP

(57) ABSTRACT

Methods, systems, and devices for wireless communications at a user equipment (UE) are described. A user equipment (UE) may receive a first data message in a sub-slot of a slot and in a sub-channel of a sidelink data channel. The UE may select a resource of a sidelink feedback channel based on a first index associated with the slot and a second index associated with the sub-slot within one or more slots comprising the slot. Additionally or alternatively, the UE may select a resource of a sidelink feedback channel from periodic resources having a slot-based periodicity based on an index associated with the sub-slot within one or more slots comprising the slot. The UE may transmit a feedback message associated with the first data message according to the selected resource.

24 Claims, 12 Drawing Sheets

FEEDBACK DESIGNS FOR SIDELINK SUB-SLOTS

TECHNICAL FIELD

The following relates to wireless communications at a user equipment (UE), including feedback designs for sidelink sub-slots.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications system, a wireless device may transmit feedback messages associated with data messages received over a sidelink channel. Methods for reporting over the sidelink channel may be deficient.

SUMMARY

The described techniques relate to improved methods, systems, devices, and apparatuses that support feedback designs for sidelink sub-slots. Generally, the described techniques provide for methods for feedback messages associated with data messages transmitted in one or more sub-slots. A user equipment (UE) may receive a data message transmitted in a sub-slot. The UE may select one or more resources for transmitting one or more feedback messages based on an index of the slot containing the sub-slot, an index of the sub-slot itself, or both. In some examples, the UE may select the one or more resources for the one or more feedback messages from periodic resources that may have a slot-based periodicity. The UE may then transmit a feedback message (e.g., over a physical sidelink feedback channel (PSFCH)) that may provide feedback about or associated with the data message to the wireless device that transmitted the data message.

A method for wireless communications at a user equipment (UE) is described. The method may include receiving a first data message in a sub-slot of a slot and in a sub-channel of a sidelink data channel, selecting a resource of a sidelink feedback channel based on a first index associated with the slot and a second index associated with the sub-slot within one or more slots including the slot, and transmitting a feedback message associated with the first data message according to the selected resource.

An apparatus for wireless communications at a UE is described. The apparatus may include a processor, memory coupled with the processor, and instructions stored in the memory. The instructions may be executable by the processor to cause the UE to receive a first data message in a sub-slot of a slot and in a sub-channel of a sidelink data channel, select a resource of a sidelink feedback channel based on a first index associated with the slot and a second index associated with the sub-slot within one or more slots including the slot, and transmit a feedback message associated with the first data message according to the selected resource.

Another apparatus for wireless communications at a UE is described. The apparatus may include means for receiving a first data message in a sub-slot of a slot and in a sub-channel of a sidelink data channel, means for selecting a resource of a sidelink feedback channel based on a first index associated with the slot and a second index associated with the sub-slot within one or more slots including the slot, and means for transmitting a feedback message associated with the first data message according to the selected resource.

A non-transitory computer-readable medium storing code for wireless communications at a UE is described. The code may include instructions executable by a processor to receive a first data message in a sub-slot of a slot and in a sub-channel of a sidelink data channel, select a resource of a sidelink feedback channel based on a first index associated with the slot and a second index associated with the sub-slot within one or more slots including the slot, and transmit a feedback message associated with the first data message according to the selected resource.

In some examples of the method, apparatuses, and non-transitory computer-readable medium described herein, selecting the resource of the sidelink feedback channel may include operations, features, means, or instructions for selecting, based on the second index, one or more physical resource blocks from a set of physical resource blocks of the sidelink feedback channel associated with the first index and the sub-channel.

In some examples of the method, apparatuses, and non-transitory computer-readable medium described herein, selecting the resource of the sidelink feedback channel may include operations, features, means, or instructions for selecting the resource of the sidelink feedback channel based on a source identifier, a destination identifier, or both.

In some examples of the method, apparatuses, and non-transitory computer-readable medium described herein, selecting the resource of the sidelink feedback channel may include operations, features, means, or instructions for associating a first cyclic shift with each sub-slot included in the slot.

In some examples of the method, apparatuses, and non-transitory computer-readable medium described herein, selecting the resource of the sidelink feedback channel may include operations, features, means, or instructions for selecting one or more physical resource blocks from a set of physical resource blocks of the sidelink feedback channel based on the first index and selecting a cyclic shift from a set of orthogonal cyclic shifts based on the second index.

Some examples of the method, apparatuses, and non-transitory computer-readable medium described herein may further include operations, features, means, or instructions for receiving a second data message in a second sub-slot, where the second sub-slot may be associated with a third index and both the first data message and the second data message may be associated with a single transport block and where transmitting the feedback message includes transmitting a positive acknowledgement or a negative acknowledgement associated with both the first data message and the second data message.

A method for wireless communications at a UE is described. The method may include receiving a first data message in a sub-slot of a slot and in a sub-channel of a sidelink data channel, selecting a resource of a sidelink feedback channel from periodic resources having a slot-based periodicity based on an index associated with the sub-slot within one or more slots including the slot, and transmitting a feedback message associated with the first data message in the resource based on the selecting.

An apparatus for wireless communications at a UE is described. The apparatus may include a processor, memory coupled with the processor, and instructions stored in the memory. The instructions may be executable by the processor to cause the UE to receive a first data message in a sub-slot of a slot and in a sub-channel of a sidelink data channel, select a resource of a sidelink feedback channel from periodic resources having a slot-based periodicity based on an index associated with the sub-slot within one or more slots including the slot, and transmit a feedback message associated with the first data message in the resource based on the selecting.

Another apparatus for wireless communications at a UE is described. The apparatus may include means for receiving a first data message in a sub-slot of a slot and in a sub-channel of a sidelink data channel, means for selecting a resource of a sidelink feedback channel from periodic resources having a slot-based periodicity based on an index associated with the sub-slot within one or more slots including the slot, and means for transmitting a feedback message associated with the first data message in the resource based on the selecting.

A non-transitory computer-readable medium storing code for wireless communications at a UE is described. The code may include instructions executable by a processor to receive a first data message in a sub-slot of a slot and in a sub-channel of a sidelink data channel, select a resource of a sidelink feedback channel from periodic resources having a slot-based periodicity based on an index associated with the sub-slot within one or more slots including the slot, and transmit a feedback message associated with the first data message in the resource based on the selecting.

In some examples of the method, apparatuses, and non-transitory computer-readable medium described herein, selecting the resource of the sidelink feedback channel may include operations, features, means, or instructions for selecting the resource of the sidelink feedback channel based on a source identifier, a destination identifier, or both.

Some examples of the method, apparatuses, and non-transitory computer-readable medium described herein may further include operations, features, means, or instructions for associating a first cyclic shift with the resource of the sidelink feedback channel, where transmitting the feedback message may be based on the first cyclic shift.

Some examples of the method, apparatuses, and non-transitory computer-readable medium described herein may further include operations, features, means, or instructions for receiving a second data message in a second sub-slot, where the second sub-slot may be associated with a second index and both the first data message and the second data message may be associated with a single transport block and where transmitting the feedback message includes transmitting a positive acknowledgement or a negative acknowledgement associated with both the first data message and the second data message.

In some examples of the method, apparatuses, and non-transitory computer-readable medium described herein, selecting the resource of the sidelink feedback channel may include operations, features, means, or instructions for selecting one or more physical resource blocks from a set of physical resource blocks of the sidelink feedback channel based on the index and selecting, from a set of orthogonal cyclic shifts, a cyclic shift to be associated with the sub-slot based on the index.

In some examples of the method, apparatuses, and non-transitory computer-readable medium described herein, selecting the resource of the sidelink feedback channel may include operations, features, means, or instructions for associating a first cyclic shift with each sub-slot included in the slot.

Some examples of the method, apparatuses, and non-transitory computer-readable medium described herein may further include operations, features, means, or instructions for determining a number of available physical resource blocks in a period of periodic feedback resources, where the number of available physical resource blocks may be a multiple of the product of a number of sub-slots in the period and a number of subchannels of the sidelink data channel.

DETAILED DESCRIPTION

In wireless communications, user equipments (UEs) may communicate via sidelink communications (e.g., directly, instead of through base station). Data transmissions may be associated with or may be transmitted in sub-slots (e.g., a further division of a slot in a time domain). In addition, UEs may transmit or receive feedback messages associated with data transmissions, including data transmissions associated with sub-slots. To transmit or receive such feedback messages, resources may be selected over which the feedback messages may be transmitted. However, selection of such resources associated with feedback for data transmissions received in sub-slots may be deficient.

To improve the selection or scheduling of feedback resources, a UE may receive data transmissions in one or more sub-slots. In some examples, the sub-slots may each be associated with an index. The UE may select a resource to use for transmitting a feedback message associated with the data transmission, and may select the resource based on the index associated with the sub-slot. The UE may select the resource in a number of ways, based on a number of factors. For example, the UE may assign feedback resources based on source identifiers, destination identifiers, a slot index, the sub-slot index, or any combination thereof. The UE may further select resources using slot-based periodicity (as opposed to sub-slots) but may provide or assign a different cyclic shift (CS) associated with each sub-slot, or may use the same CS for all sub-slots (e.g., all sub-slots within a slot). Additionally or alternatively, the UE may select resources based upon sub-slot periodicity. Further, the UE may select or determine a number of resources to select from based on the number of sub-slots and a number of subchannels in connection with sub-slot-based periodicity.

Aspects of the disclosure are initially described in the context of wireless communications systems. Aspects of the disclosure are then illustrated by an example system, an example resource selection scheme, and a process flow. Aspects of the disclosure are further illustrated by and described with reference to apparatus diagrams, system diagrams, and flowcharts that relate to feedback designs for sidelink sub-slots.

Figure 1:
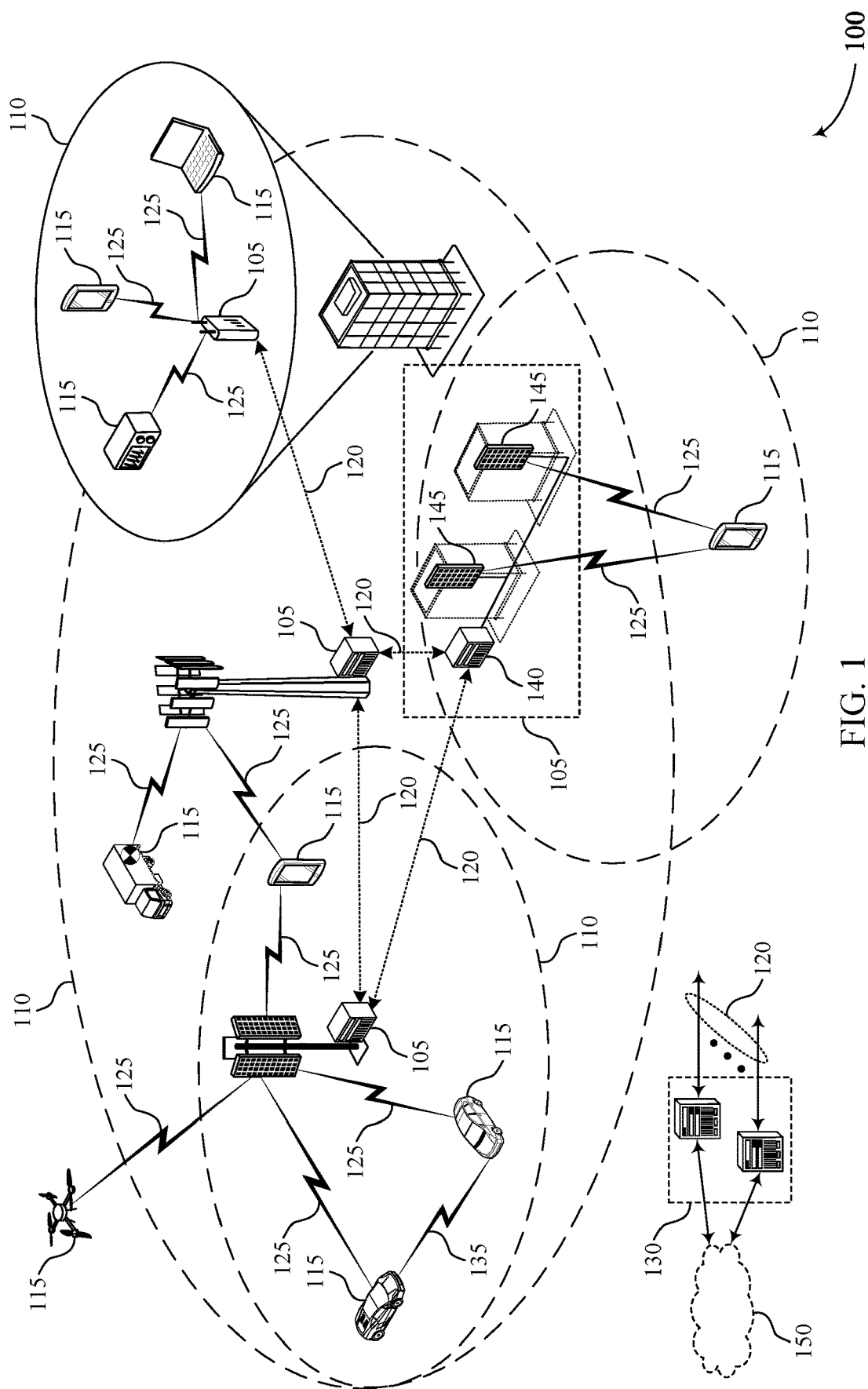
FIG. 1 illustrates an example of a wireless communications system that supports feedback designs for sidelink sub-slots in accordance with aspects of the present disclosure.

FIG. 1 illustrates an example of a wireless communications system 100 that supports feedback designs for sidelink sub-slots in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a device such as a cellular phone, a smart phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLO-NASS, or Galileo, or a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, drones, robots, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT), and FeNB-IoT (further enhanced NB-IoT).

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). A wireless network, for example a wireless local area network (WLAN), such as a Wi-Fi (e.g., Institute of Electrical and Electronics Engineers (IEEE) 802.11) network may include an access point (AP) that may communicate with one or more wireless or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a device may communicate with an associated AP via downlink (e.g., the communication link from the AP to the device) and uplink (e.g., the communication link from the device to the AP). A wireless personal area network (PAN), which may include a Bluetooth connection, may provide for short range wireless connections between two or more paired wireless devices. For example, wireless devices such as cellular phones may utilize wireless PAN communications to exchange information such as audio signals with wireless headsets. Components within a wireless communication system may be coupled (for example, operatively, communicatively, functionally, electronically, and/or electrically) to each other.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple sub-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a sub-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless devices may implement one or more techniques for feedback resource selection for transmitting feedback messages associated with sub-slot-based data messages on a sidelink channel. For example, a UE 115 may receive one or more data messages that may be transmitted in one or more sub-slots of one or more slots over a sidelink channel. In the course of communications, the UE 115 may transmit a feedback message for some or all of the received data messages. As part of this process, the UE may select one or more feedback resources for transmission of the feedback messages. The UE may select these feedback resources based on a slot index, a sub-slot index, or both, and may further select these feedback resources from a set of periodic resources that may have a slot-based periodicity. The UE may transmit one or more feedback messages over the selected one or more feedback resources to provide the feedback to the device that transmitted the data message (or to another wireless device).

Figure 2:
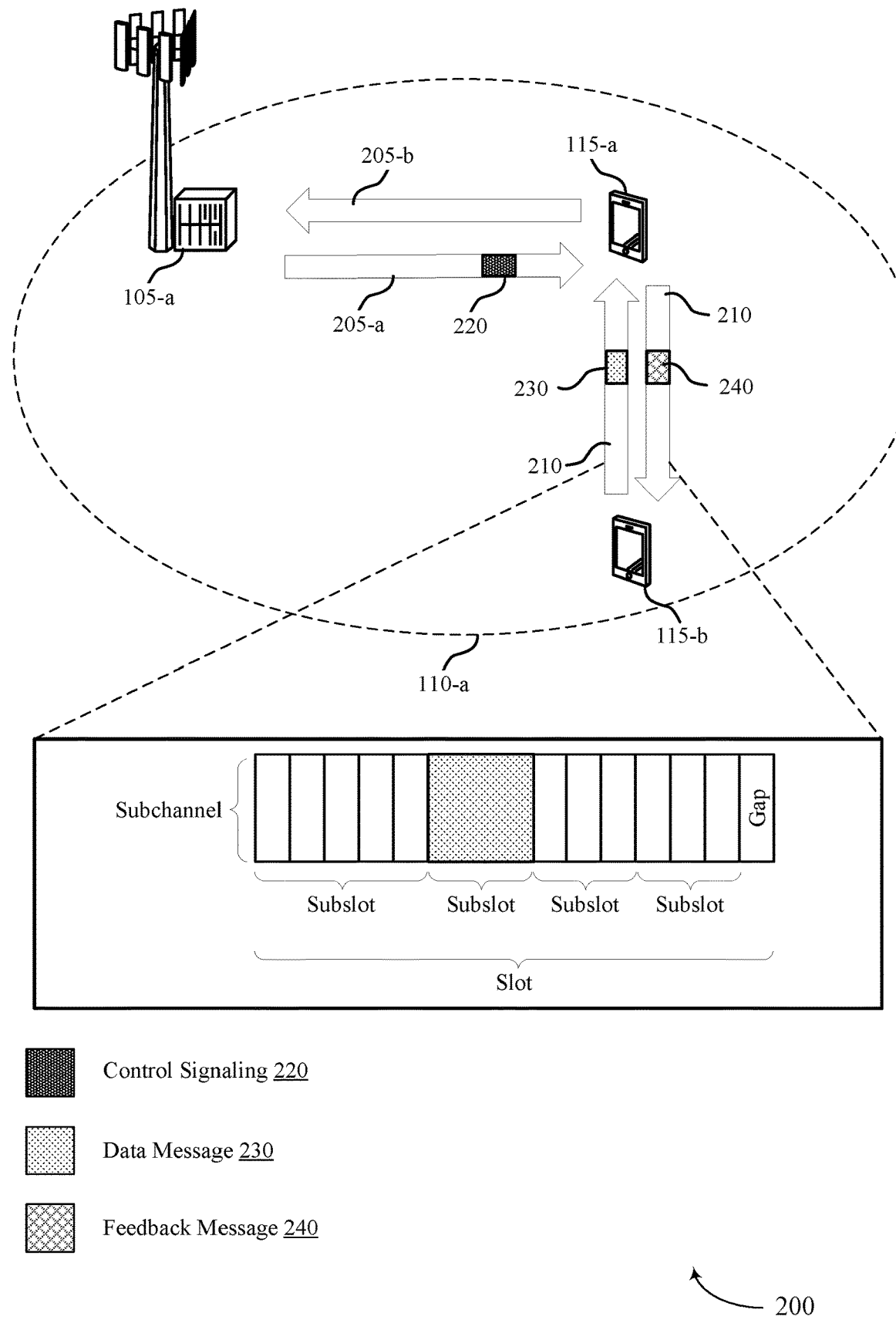
FIG. 2 illustrates an example of a system that supports feedback designs for sidelink sub-slots in accordance with aspects of the present disclosure.

FIG. 2 illustrates an example of a system 200 that supports feedback designs for sidelink sub-slots in accordance with aspects of the present disclosure. The system 200 may include a base station 105-a that may be an example of the base station 105 discussed in relation to FIG. 1. The system 200 may include UE 115-a and UE 115-b that may be examples of the UEs 115 discussed in relation to FIG. 1. In some examples, the base station 105-a and the UE 115 a may be located in a geographic coverage area 110-a. The base station 105-a may communicate with the UE 115-a via one or more downlink communication links 205-a and one or more uplink communication links 205-b, and may transmit control signaling 220 to the UE 115-a (e.g., control signaling associated with feedback resource selection for the UE 115-a to transmit feedback messages to the UE 115-b in the course of sidelink communications). In some examples, UE 115-a may communicate with UE 115-b via one or more sidelink communication links 210. In some examples, the UE 115-a may be within the geographic coverage area 110-a of the base station 105-a while communicating with the UE 115-b (e.g., sidelink mode 1), and in other examples, the UE 115-a may be outside of the geographic coverage area 110-a of the base station 105-a while communicating with the UE 115-b (e.g., sidelink mode 2).

In some examples, a time domain may be divided into slots to aid scheduling of transmissions. Further, a slot may be divided into sub-slots, as shown in FIG. 2. In some examples, a slot may be divided into sub-slots based on a given pattern. For example, a length of one or more sub-slots may be defined, and a number of sub-slots may also be defined. In some examples, sidelink control information (SCI) may also be used in connection with sub-slots. For example, SCI may be transmitted at the beginning of a slot. An SCI transmission may indicate a transmission or reservation of a number of sub-slots in the same slot or in one or more other slots. In some examples, a UE may not employ automatic gain control (AGC) symbols, since a receiving device may configure the AGC based on a first symbol of a slot, and the receiver may then use the same AGC configuration or value for the transmission of data messages (or other transmissions) in one or more sub-slots.

The use of sub-slots may reduce scheduling time, turn-around time, or other time periods associated with wireless communications (including sidelink communications). In some examples, each sub-slot may include resources for control signaling, data signaling, or both, and each sub-slot may be self-schedulable, decodable, or both. For example, the UE 115-*a*, the UE 115-*b*, or both, may select or reserve one or more sub-slots for communications. In some examples, as a number of sub-slots increases per slot (which may enhance scheduling latency and may be suitable for small packets), more symbols may be allocated to gaps. However, in some use cases (e.g., if a large number of UEs are to be supported), such overhead may degrade or reduce latency reduction gains.

In some examples, gap symbols may be used for transmission/reception switching. In some examples, such switching may occur at a slot boundary, and a gap may be used at or near a slot boundary. For example, as shown in FIG. 2, a gap may be placed at the end of a slot.

In some examples, the UE 115-*b* may transmit one or more data messages 230 to the UE 115-*a* in the course of sidelink communications, and the data messages 230 may be transmitted in one or more sub-slots of one or more slots. For example, as depicted in FIG. 2, a slot may include one or more sub-slots, and a data message may be transmitted in or associated with a sub-slot. The UE 115-*a* may select one or more resources (e.g., of a sidelink feedback channel) for transmission of one or more feedback messages 240. The UE 115-*a* may select such resources based on one or more factors, including a slot index in which the data message is received, a sub-slot index in which the data message is received, or both. The UE 115-*a* may then transmit a feedback message 240 that may be associated with the data message 230. The feedback message 240 may include a positive acknowledgement (ACK) or a negative acknowledgement (NACK) associated with the data message 230. Additionally or alternatively, the feedback message 240 may include additional information associated with the data message 230. In this way, the UE 115-*a* may select resources for transmission of the feedback message 240 associated with the data message 230 transmitted in a sub-slot.

In some examples, the UE 115-*a* may receive control signaling 220 (e.g., SCI) that may schedule a PSSCH message and may further indicate that the UE 115-*a* is to transmit the feedback message 240 (e.g., a PSFCH message). The feedback message 240 may include feedback information (e.g., HARQ-ACK information) that may include either an ACK or a NACK, or only a NACK. The UE 115-*a* may further receive (e.g., via control signaling 220) an indication (e.g., via one or more parameters, such as a sl-PSFCH-Period parameter) of a number of slots in a resource pool for a period of PSFCH transmission occasions resources. In some examples, the number of slots may be 0, in which case the use of a feedback message 240 may be disabled. In some examples, the UE 115-*a* may expect or determine that a particular slot (e.g., a slot with an index within a range from 0 up to a number of slots included in a resource pool, such as a number of slots within 10240 milliseconds or another value) may include a resource for transmission of the feedback message 240 based upon a parameter (e.g., sl-PSFCH-Period parameter). In some examples, the UE 115-*a* may receive an indication (e.g., via the control signaling 220 or other signaling) that may indicate that the UE 115-*a* is not to transmit the feedback message 240 (e.g., even though the UE 115-*a* may receive a PSSCH message, such as the data message 230).

In some examples, the UE 115-*a* may receive a PSSCH transmission (e.g., the data message 230) associated with a resource pool. Further, the UE 115-*a* may receive an indication that the UE 115-*a* is to transmit feedback (e.g., the feedback message 240) in response to the PSSCH transmission. Such an indication may be received through the control signaling 220 or through other signaling, and the indication may include a value of a parameter that indicates whether feedback (e.g., the feedback message 240, HARQ feedback, or other signaling) is enabled or disabled. In some examples, the UE 115-*a* may transmit the feedback message 240 or other feedback in a slot that may include PSFCH resources, and the slot may further be at least a number of slots (e.g., as defined or indicated in a parameter, such as sl-MinTimeGapPSFCH) after a last slot of a PSSCH message, the data message 230, or other signaling.

In some examples, the UE 115-*a* may receive an indication of a number or set of PRBs associated with a resource pool, and the PRBs may be designated for use with one or more feedback messages, such as the feedback message 240. In some examples, the UE 115-*a* may allocate or associate one or more PRBs (e.g., of the set of PRBs) to one or more slots of a set of PSSCH slots that may be associated with one or more PSFCH slots, one or more subchannels, or both. In some examples, the UE 115-*a* may allocate the PRBs to the one or more slots of the set of PSSCH slots, and may index such slots (e.g., in an ascending order of indices). Further, the UE 115-*a* may allocate the PRBs to one or more subchannels associated with the received one or more data messages (e.g., the data message 230).

In some examples, the slot indices may be associated with a slot that includes a sub-slot in which the UE 115-*a* may receive the data message 230, and the UE 115-*a* may select one or more resources (e.g., PRBs) for transmission of the feedback message 240 based on the slot index associated with the slot. Additionally or alternatively, the sub-slots may also be associated with indices, and the UE 115-*a* may select one or more resources (e.g., PRBs) for transmission of the feedback message 240 based on the sub-slot indices. Additionally or alternatively, the UE 115-*a* may employ feedback resources (e.g., periodic feedback resources) for transmission of the feedback message 240, and the UE 115-*a* may select such resources based on an index of a sub-slot in which the data message 230 was received.

In some examples, a second symbol of a feedback transmission (e.g., the feedback message 240) may be located in a slot based on one or more parameters, such as a starting point parameter (e.g., startSLsymbols), a length parameter (e.g., lengthSLsymbols), or any combination thereof.

In some examples, a UE 115-*a* may determine or select resources available for multiplexing feedback information (e.g., HARQ-ACK information) based on a number of CS pairs associated with a resource pool, an indication of a feedback resource type (e.g., as indicated by a parameter, such as sl-PSFCH-CandidateResourceType), or any combination thereof. In some such cases, feedback resources may be indexed using an ordered (e.g., ascending) order of indices associated with the PRBs, and may further be indexed using an ordered (e.g., ascending) order of CS pair indices.

In some examples, a UE may determine or select an index of a feedback resource based on a source identifier (e.g., a physical layer source identifier, which may be provided in control signaling), an identifier of the UE 115-*a*, or any combination thereof.

In some examples, the UE 115-*a* may determine or select a first value or parameter (e.g., a value or parameter for computing one or more CSs) from a CS pair index that may correspond to a feedback resource index. Additionally or alternatively, the UE 115-*a* may determine or select a second value or parameter for computing one or more CSs based on an indication received in control signaling, a mapping between feedback bit values to cyclic shift values, or any combination thereof.

Figure 3:
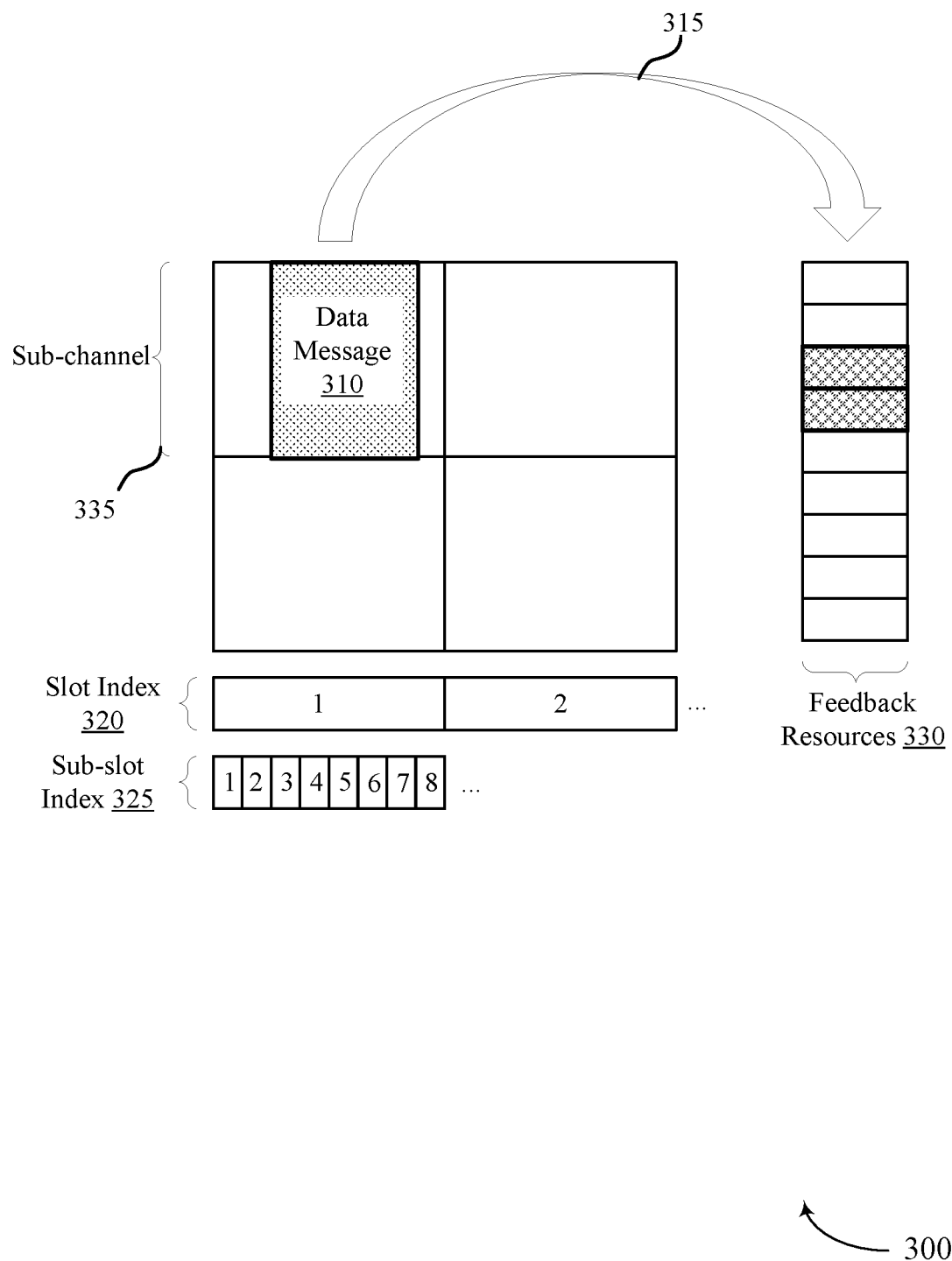
FIG. 3 illustrates an example of a resource selection scheme that supports feedback designs for sidelink sub-slots in accordance with aspects of the present disclosure.

FIG. 3 illustrates an example of a resource selection scheme 300 that supports feedback designs for sidelink sub-slots in accordance with aspects of the present disclosure.

In the course of sidelink communications, a first UE may map or associate received data messages 310 (or other transmissions) with one or more feedback resources 330 for transmitting one or more feedback messages associated with the data messages 310 (or other data transmissions). In some examples, such a mapping may be based on one or more factors, including a starting sub-channel of the data message 310 (e.g., sl-PSFCH-CandidateResourceType may be configured as startSubCH), a number of subchannels in or associated with a data message 310 (e.g., sl-PSFCH-CandidateResource Type may be configured as allocSubCH), a slot containing or associated with the data message 310, a source identifier, a destination identifier, or any combination thereof. For example, the mapping 315 may associate the data message 310 with one or more feedback resources 330 based on the slot index 320 of the data message 310 and an index associated with the sub-channel 335. Additionally or alternatively, the mapping 315 may be based on the sub-slot index 325. In some examples, a number of physical sidelink feedback channel (PSFCH) resources (or other feedback resources) may be equal or greater than a number of UEs for groupcast messages where all UEs receiving the message provide feedback (e.g., groupcast option 2).

A UE (or other wireless device) may map sub-slots to feedback resources in various ways. In some examples, a UE may define a mapping between a subchannel that may span a slot and a number of resources (e.g., one or more resource blocks). For example, a UE may identify one or more feedback resources that may be mapped to a group of sub-slots (e.g., all sub-slots of a slot) of one sub-channel. However, a UE may perform further mapping within the feedback resources (e.g., by assigning or associating resources from the identified set or number of resources with one or more sub-slots). For example, the UE may map one or more sub-slots within a given sub-channel to different resources (e.g., HARQ-ACK resources). The HARQ-ACK resources may include physical resources such as PRBs, or cyclic shift resources of the HARQ-ACK message. Such resources may be selected in a cyclical fashion, or according to parameters associated with the sidelink transmitter or receiver (e.g., sourceID, destinationID). For example, a UE may select a feedback resource from the feedback resources 330 based on a source identifier, a destination identifier, the sub-slot index 325, or any combination thereof. One such approach may include the use of an equation such as i=(sourceID+destinationID+subslotIndex) mod X. In the previous equation, the X value may define a parameter that may be associated with the cyclical fashion of selection of feedback resources. For example, if the X parameter is given a first value, the UE may cyclically select resources in a manner that is based on the first value, and if the X parameter is given a second value, the UE may cyclically select resources based on the second value in a manner that may be different from the manner of selection based on the first value.

In the course of selecting feedback resources 330, the UE may assign one or more resource blocks of the feedback resources 330 from a set of feedback resources 330 based on a source identifier, a destination identifier, a cyclic selection factor, one or more additional factors (e.g., a slot index 320, a sub-slot index 325, or both), or any combination thereof. For example, each sub-channel and slot may be associated with multiple feedback resources 330 (e.g., PRBs, cyclic shifts). The UE may select a feedback resource from the multiple feedback resources 330 based on a formula including a sub-slot index 325, a source identifier, a destination identifier, a cyclic selection factor (e.g., X), or any combination thereof, such as i=(sourceID+destinationID+subslotIndex) mod X. In this way, one or more feedback resources 330 may be selected based on the sub-slot index in a cyclical fashion. In some examples, if the UE selects a same resource block for multiple sub-slots within one slot and one sub-channel, one or more responses (e.g., ACK/NACK) associated with the same resource block may be assigned different cyclic shifts (CSs) (e.g., orthogonal CSs). In some cases, the UE may select a PRB according to a first set of parameters including one or more of the sourceID, destinationID, or sub-slot index, and may select a CS resource according to a second set of parameters including one or more of the sourceID, destinationID, or sub-slot index, where the second set of parameters may be different from the first set of parameters. Thus, in situations where multiple UEs select the same PRB (e.g., where there are more sub-slots per slot than there are PRBs per slot and sub-channel), different CSs may be selected by the different UEs. In some examples, the UE may receive one or more data messages 310, and the one or more data messages 310 may be associated with a single transport block (TB). In such a case, the UE may generate a single feedback message (e.g., a single ACK/NACK) associated with the one or more data messages 310 associated with the single TB. The resources for the single feedback message may be determined based on the parameters (e.g., slot index, sub-slot index, sub-channel index) of a first in time of the one or more data messages.

In some examples, a UE may select one or more feedback resources 330 according to one or more approaches as described herein, but may also select a CS (e.g., from a set of orthogonal CSs) to be associated with each sub-slot. Additionally or alternatively, a UE may select one or more feedback resources 330 as described herein, but may utilize a sub-slot index 325 in place of a slot index 320. For example, the UE, instead of selecting or assigning feedback resources 330 based on a slot index 320, may select or assign one or more feedback resources 330 based on a sub-slot index 325. In some such cases, a number of sub-slots in a resource pool may be fixed. Further, the UE may select one or more feedback resources 330 based on a periodicity of such feedback resources 330 (e.g., a periodicity associated with a PSFCH).

In some examples, the periodicity of the feedback resources 330 may be a slot-based periodicity, and in some examples, the periodicity of the feedback resources 330 may be a sub-slot-based periodicity. In some examples including slot-based periodicity, the UE may assign or associated different CSs with different sub-slots or data messages 310 received in one or more sub-slots. In some examples, the association of different CSs in this way may be based on an overlap in resources (e.g., actual or expected overlap of resources). Additionally or alternatively, the UE may assign a CS (either the same CS or different CSs) to be used for a set of slots or sub-slots. Additionally or alternatively, in some examples, the periodicity of the feedback resources 330 may instead be a sub-slot based periodicity.

In addition or as an alternative to the approaches described herein, a UE may determine a number of feedback resources 330 from which to select. For examples, a number of feedback resources 330 (e.g., a number of resource blocks) for feedback messages (e.g., in each period of feedback message or PSFCH periodicity) may be a multiple of the product of a number of sub-slots in a feedback message or PSFCH periodicity and a number of subchannels).

In some examples, a wireless device may configure various parameters for feedback resource determination. For example, a wireless device may configure a periodicity parameter (e.g., periodPSFCHresource) that may indicate the periodicity of feedback transmissions. In some examples, such a parameter may define the periodicity of feedback transmissions in a number of slots. Such a parameter may take various values (e.g., 0, 1, 2, 4), and, in some cases, a value of 0 may indicate that feedback transmissions from a wireless device may be disabled.

In some examples, a wireless device may configure transmission of feedback messages in a first slot that may include feedback resources and may be at least a number of slots (e.g., in a resource pool) after a last slot of a data message 310 reception (e.g., a physical sidelink shared channel (PSSCH) transmission reception). In some examples, the number of slots after the last slot of a data message 310 may be provided or defined by a parameter (e.g., minTimeGapPSFCH). In some examples, a wireless device may further configure parameters associated with a number of physical resource blocks (PRBs) in a resource pool, a number of sub-channels for a resource pool, a number of PSSCH slots that may be associated with a PSFCH slot (e.g., that may be determined by a periodicity parameter such as periodPSFCHresource), one or more other parameters, or any combination thereof.

Figure 4:
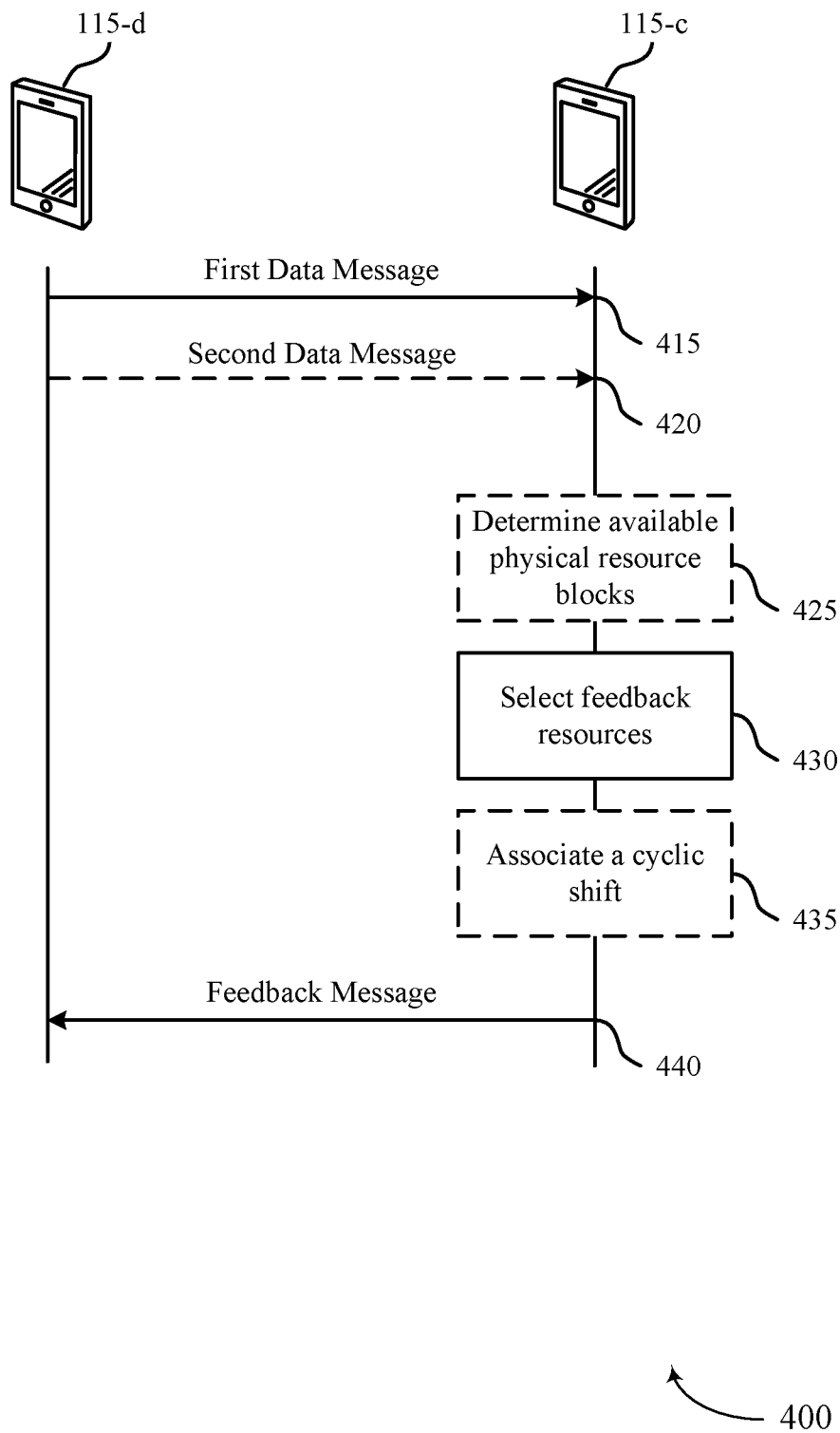
FIG. 4 illustrates an example of a process flow that supports feedback designs for sidelink sub-slots in accordance with aspects of the present disclosure.

FIG. 4 illustrates an example of a process flow 400 that supports feedback designs for sidelink sub-slots in accordance with aspects of the present disclosure. The process flow 400 may implement various aspects of the present disclosure described with reference to FIGS. 1-3. The process flow 400 may include a UE 115-d, and a UE 115-c, which may be examples of UE 115 as described with reference to FIGS. 1-3. In some examples, the UE 115-c may be configured with rules, procedures, configurations, or information for selection of feedback resources for sidelink sub-slots.

In the following description of the process flow 400, the operations between the UE 115-d and the UE 115-c may be performed in different orders or at different times. Some operations may also be left out of the process flow 400, or other operations may be added. Although the UE 115-c and the UE 115-d are shown performing the operations of the process flow 400, some aspects of some operations may also be performed by one or more other wireless devices.

At 415, the UE 115-c may receive a first data message in a sub-slot of a slot and in a sub-channel of a sidelink data channel.

At 420, the UE 115-c may receive a second data message in a second sub-slot, and the second sub-slot may be associated with a third index and both the first data message and the second data message may be associated with a single transport block. Additionally or alternatively, the UE 115-c may receive a second data message in a second sub-slot, and the second sub-slot may be associated with a second index and both the first data message and the second data message may be associated with a single transport block.

At 425, the UE 115-c may determine a number of available physical resource blocks in a period of periodic feedback resources, and the number of available physical resource blocks may be a multiple of the product of a number of sub-slots in the period and a number of subchannels of the sidelink data channel.

At 430, the UE 115-c may select a resource of a sidelink feedback channel based at least in part on a first index associated with the slot and a second index associated with the sub-slot within one or more slots comprising the slot. For example, each slot of a series of slots may have sub-slots with corresponding indices (e.g., the sub-slot indices may start over for each slot). Alternatively, a series of sub-slot indices may correspond to or be associated with a group of one or more slots. For example, a series of sub-slot indices spanning across multiple slots may not "start over" at a slot boundary, and sub-slot indices {0, . . . , n-1} may occupy the same amount of time resources as n/m slots, where m is the number of sub-slots per slot. As such, in some examples, a series of sub-slot indices may span one or more slots. Further, the group of one or more slots may include the slot that may be associated with a corresponding slot index. Additionally or alternatively, the UE 115-c may select a resource of a sidelink feedback channel from periodic resources having a slot-based periodicity based at least in part on an index associated with the sub-slot within one or more slots comprising the slot, and may select the resource independently of the slot index. In some examples, selecting the resource of the sidelink feedback channel may include selecting, based at least in part on the second index, one or more physical resource blocks from a set of physical resource blocks of the sidelink feedback channel associated with the first index and the sub-channel. In some examples, selecting the resource of the sidelink feedback channel may include selecting the resource of the sidelink feedback channel based at least in part on a source identifier, a destination identifier, or both. In some examples, selecting the resource of the sidelink feedback channel may include selecting one or more physical resource blocks from a set of physical resource blocks of the sidelink feedback channel based at least in part on the first index. Additionally or alternatively, selecting one or more physical resource blocks from a set of physical resource blocks of the sidelink feedback channel based at least in part on the index.

At 435, the UE 115-c may associate a first cyclic shift with each sub-slot comprised in the slot. Additionally or alternatively, the UE 115-c may associate a first cyclic shift with the resource of the sidelink feedback channel, and transmitting the feedback message may be based at least in part on the first cyclic shift. Additionally or alternatively, the UE 115-c may select a cyclic shift from a set of orthogonal cyclic shifts based at least in part on the second index. Additionally or alternatively, the UE 115-c may select, from a set of orthogonal cyclic shifts, a cyclic shift to be associated with the sub-slot based at least in part on the index. Additionally or alternatively, the UE 115-c may associate a first cyclic shift with each sub-slot comprised in the slot.

At 440, the UE 115-c may transmit a feedback message associated with the first data message according to the selected resource. In some examples, transmitting the feedback message may include transmitting a positive acknowledgement or a negative acknowledgement associated with both the first data message and the second data message.

Figure 5:
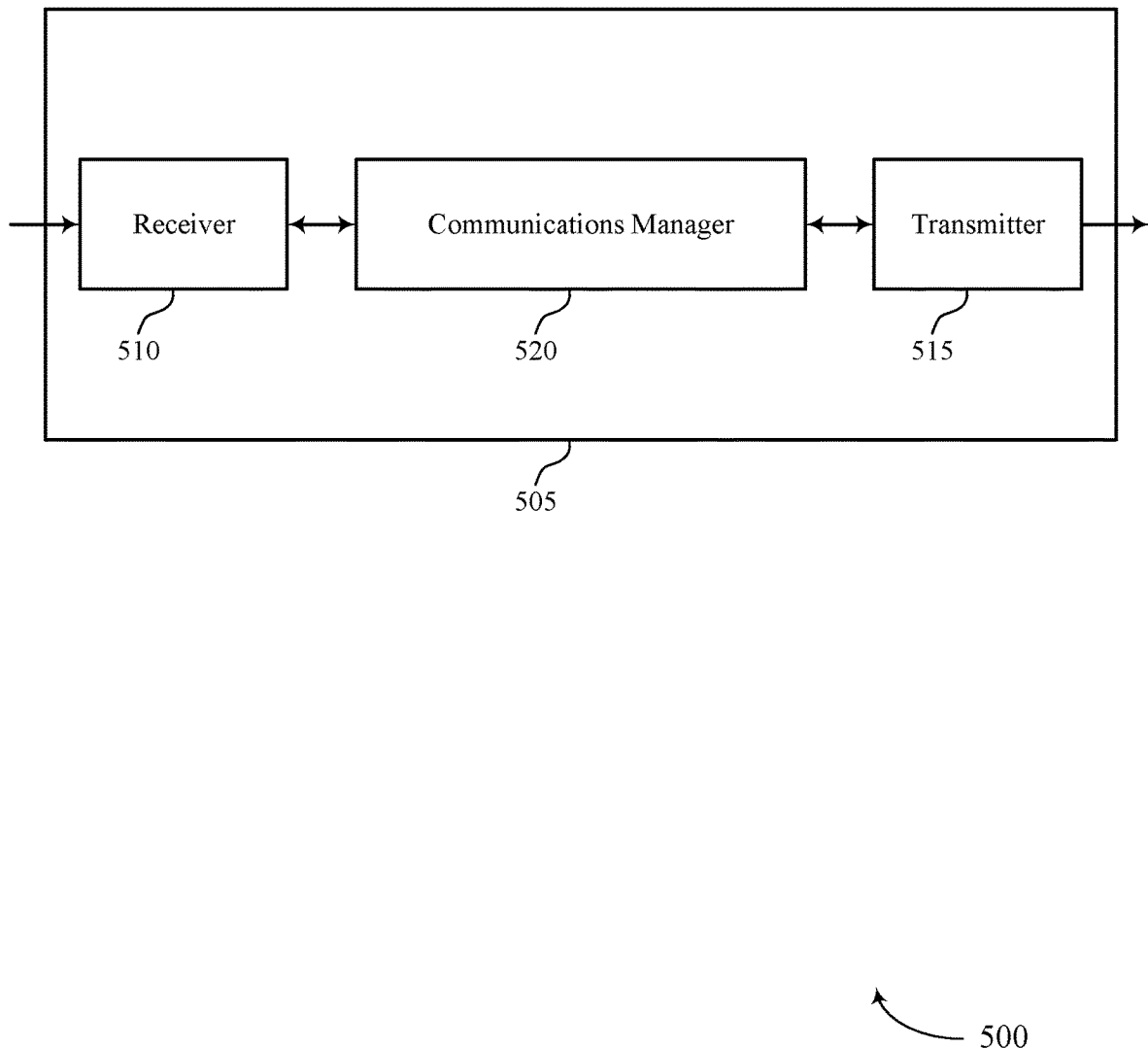
FIGS. 5 and 6 show block diagrams of devices that support feedback designs for sidelink sub-slots in accordance with aspects of the present disclosure.

FIG. 5 shows a block diagram 500 of a device 505 that supports feedback designs for sidelink sub-slots in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to feedback designs for sidelink sub-slots). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to feedback designs for sidelink sub-slots). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of feedback designs for sidelink sub-slots as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software) executed by a processor. If implemented in code executed by a processor, the functions of the communications manager 520, the receiver 510, the transmitter 515, or various combinations or components thereof may be performed by a general-purpose processor, a DSP, a central processing unit (CPU), a graphics processing unit (GPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving a first data message in a sub-slot of a slot and in a sub-channel of a sidelink data channel. The communications manager 520 may be configured as or otherwise support a means for selecting a resource of a sidelink feedback channel based on a first index associated with the slot and a second index associated with the sub-slot within one or more slots including the slot. The communications manager 520 may be configured as or otherwise support a means for transmitting a feedback message associated with the first data message according to the selected resource.

Additionally or alternatively, the communications manager 520 may support wireless communications at a UE in accordance with examples as disclosed herein. For example, the communications manager 520 may be configured as or otherwise support a means for receiving a first data message in a sub-slot of a slot and in a sub-channel of a sidelink data channel. The communications manager 520 may be configured as or otherwise support a means for selecting a resource of a sidelink feedback channel from periodic resources having a slot-based periodicity based on an index associated with the sub-slot within one or more slots including the slot. The communications manager 520 may be configured as or otherwise support a means for transmitting a feedback message associated with the first data message in the resource based on the selecting.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing, reduced power consumption, more efficient utilization of communication resources, or a combination thereof.

Figure 6:
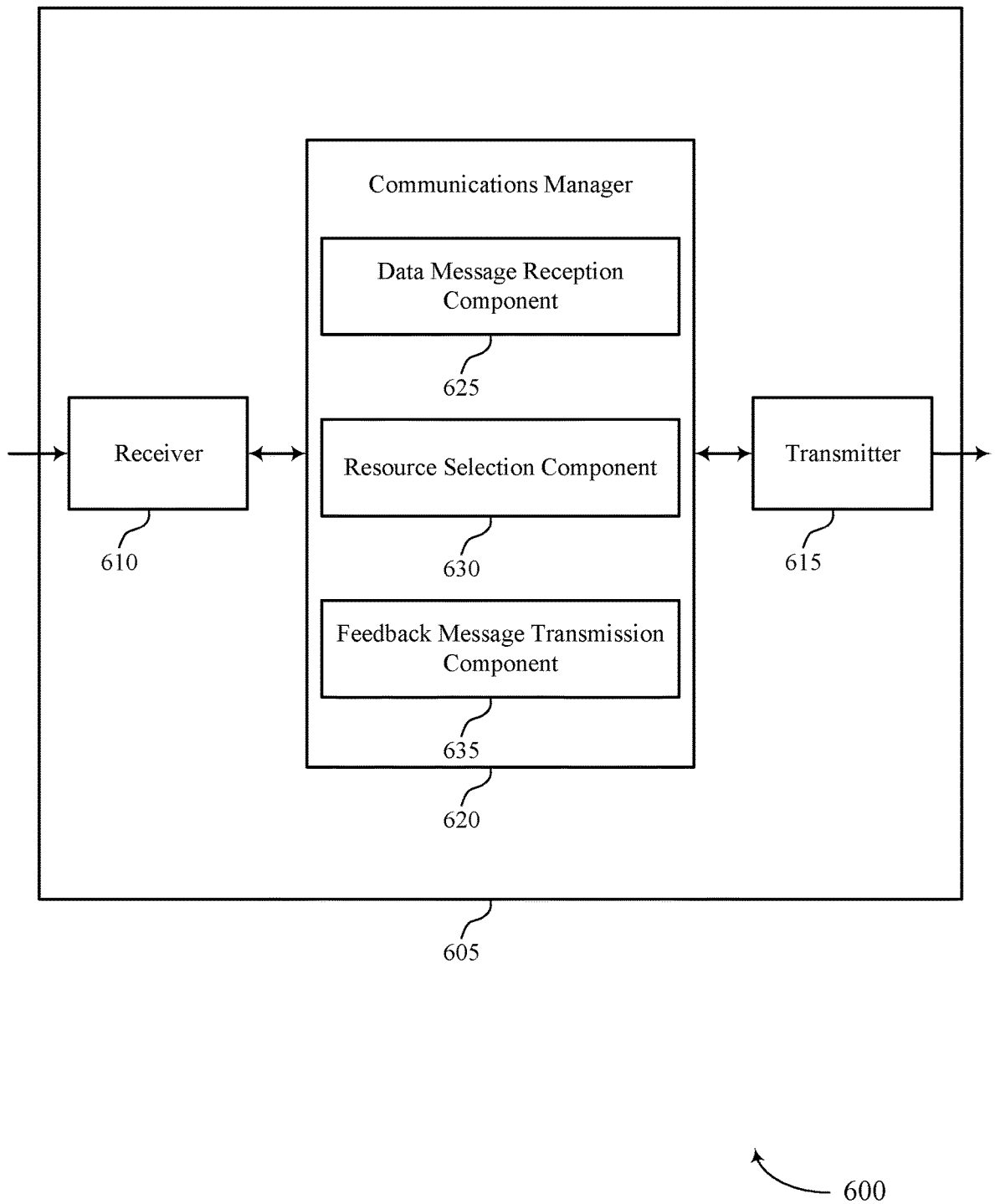

FIG. 6 shows a block diagram 600 of a device 605 that supports feedback designs for sidelink sub-slots in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to feedback designs for sidelink sub-slots). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to feedback designs for sidelink sub-slots). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of feedback designs for sidelink sub-slots as described herein. For example, the communications manager 620 may include a data message reception component 625, a resource selection component 630, a feedback message transmission component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The data message reception component 625 may be configured as or otherwise support a means for receiving a first data message in a sub-slot of a slot and in a sub-channel of a sidelink data channel. The resource selection component 630 may be configured as or otherwise support a means for selecting a resource of a sidelink feedback channel based on a first index associated with the slot and a second index associated with the sub-slot within one or more slots including the slot. The feedback message transmission component 635 may be configured as or otherwise support a means for transmitting a feedback message associated with the first data message according to the selected resource.

Additionally or alternatively, the communications manager 620 may support wireless communications at a UE in accordance with examples as disclosed herein. The data message reception component 625 may be configured as or otherwise support a means for receiving a first data message in a sub-slot of a slot and in a sub-channel of a sidelink data channel. The resource selection component 630 may be configured as or otherwise support a means for selecting a resource of a sidelink feedback channel from periodic resources having a slot-based periodicity based on an index associated with the sub-slot within one or more slots including the slot. The feedback message transmission component 635 may be configured as or otherwise support a means for transmitting a feedback message associated with the first data message in the resource based on the selecting.

Figure 7:
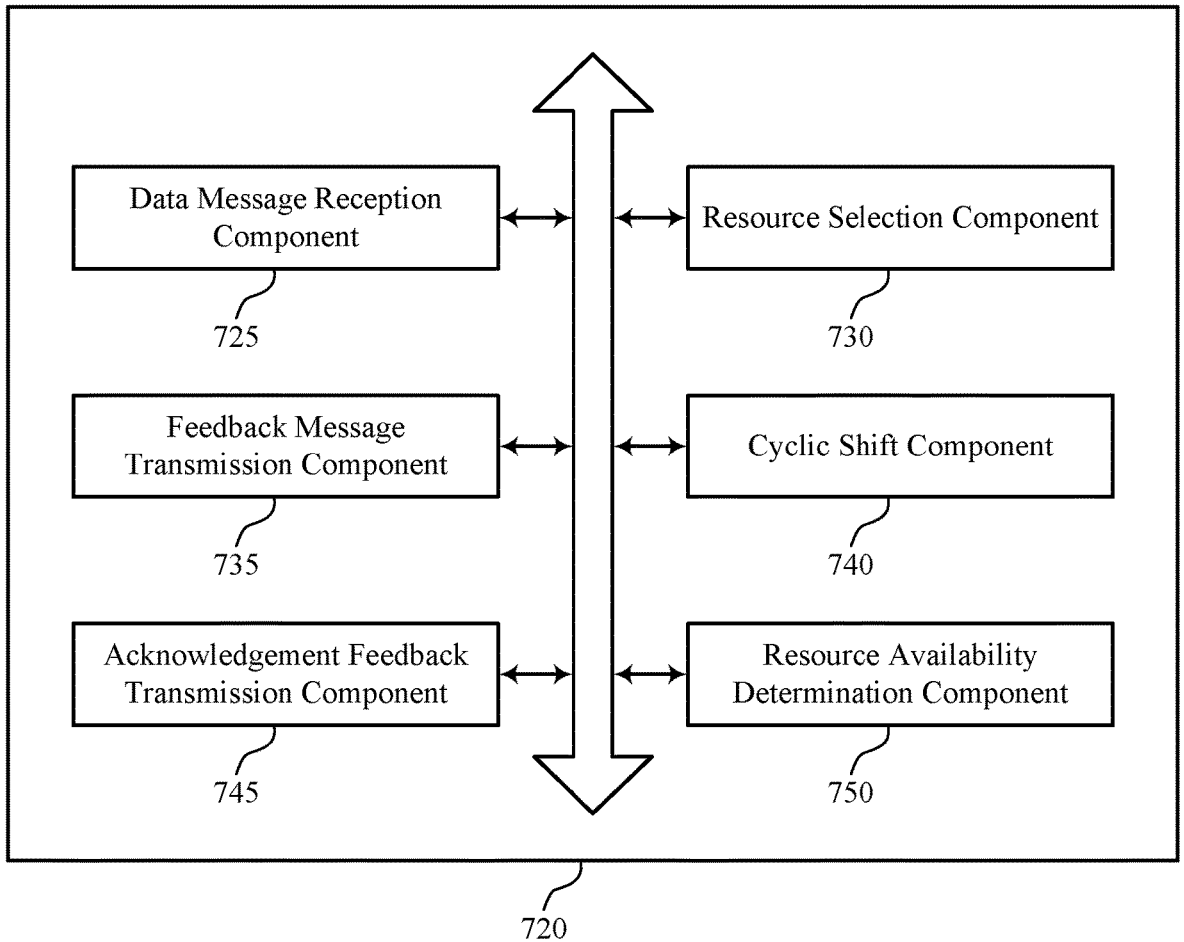
FIG. 7 shows a block diagram of a communications manager that supports feedback designs for sidelink sub-slots in accordance with aspects of the present disclosure.

FIG. 7 shows a block diagram 700 of a communications manager 720 that supports feedback designs for sidelink sub-slots in accordance with aspects of the present disclosure. The communications manager 720 may be an example of aspects of a communications manager 520, a communications manager 620, or both, as described herein. The communications manager 720, or various components thereof, may be an example of means for performing various aspects of feedback designs for sidelink sub-slots as described herein. For example, the communications manager 720 may include a data message reception component 725, a resource selection component 730, a feedback message transmission component 735, a cyclic shift component 740, an acknowledgement feedback transmission component 745, a resource availability determination component 750, or any combination thereof. Each of these components may communicate, directly or indirectly, with one another (e.g., via one or more buses).

The communications manager 720 may support wireless communications at a UE in accordance with examples as disclosed herein. The data message reception component 725 may be configured as or otherwise support a means for receiving a first data message in a sub-slot of a slot and in a sub-channel of a sidelink data channel. The resource selection component 730 may be configured as or otherwise support a means for selecting a resource of a sidelink feedback channel based on a first index associated with the slot and a second index associated with the sub-slot within one or more slots including the slot. The feedback message transmission component 735 may be configured as or otherwise support a means for transmitting a feedback message associated with the first data message according to the selected resource.

In some examples, to support selecting the resource of the sidelink feedback channel, the resource selection component 730 may be configured as or otherwise support a means for selecting, based on the second index, one or more physical resource blocks from a set of physical resource blocks of the sidelink feedback channel associated with the first index and the sub-channel.

In some examples, to support selecting the resource of the sidelink feedback channel, the resource selection component 730 may be configured as or otherwise support a means for selecting the resource of the sidelink feedback channel based on a source identifier, a destination identifier, or both.

In some examples, to support selecting the resource of the sidelink feedback channel, the cyclic shift component 740 may be configured as or otherwise support a means for associating a first cyclic shift with each sub-slot included in the slot.

In some examples, to support selecting the resource of the sidelink feedback channel, the resource selection component 730 may be configured as or otherwise support a means for selecting one or more physical resource blocks from a set of physical resource blocks of the sidelink feedback channel based on the first index. In some examples, to support selecting the resource of the sidelink feedback channel, the cyclic shift component 740 may be configured as or otherwise support a means for selecting a cyclic shift from a set of orthogonal cyclic shifts based on the second index.

In some examples, the data message reception component 725 may be configured as or otherwise support a means for receiving a second data message in a second sub-slot, where the second sub-slot is associated with a third index and both the first data message and the second data message are associated with a single transport block. In some examples, the acknowledgement feedback transmission component 745 may be configured as or otherwise support a means for where transmitting the feedback message includes transmitting a positive acknowledgement or a negative acknowledgement associated with both the first data message and the second data message.

Additionally or alternatively, the communications manager 720 may support wireless communications at a UE in accordance with examples as disclosed herein. In some examples, the data message reception component 725 may be configured as or otherwise support a means for receiving a first data message in a sub-slot of a slot and in a sub-channel of a sidelink data channel. In some examples, the resource selection component 730 may be configured as or otherwise support a means for selecting a resource of a sidelink feedback channel from periodic resources having a slot-based periodicity based on an index associated with the sub-slot within one or more slots including the slot. In some examples, the feedback message transmission component 735 may be configured as or otherwise support a means for transmitting a feedback message associated with the first data message in the resource based on the selecting.

In some examples, to support selecting the resource of the sidelink feedback channel, the resource selection component 730 may be configured as or otherwise support a means for selecting the resource of the sidelink feedback channel based on a source identifier, a destination identifier, or both.

In some examples, the cyclic shift component 740 may be configured as or otherwise support a means for associating a first cyclic shift with the resource of the sidelink feedback channel, where transmitting the feedback message is based on the first cyclic shift.

In some examples, the data message reception component 725 may be configured as or otherwise support a means for receiving a second data message in a second sub-slot, where the second sub-slot is associated with a second index and both the first data message and the second data message are associated with a single transport block. In some examples, the acknowledgement feedback transmission component 745 may be configured as or otherwise support a means for where transmitting the feedback message includes transmitting a positive acknowledgement or a negative acknowledgement associated with both the first data message and the second data message.

In some examples, to support selecting the resource of the sidelink feedback channel, the resource selection component 730 may be configured as or otherwise support a means for selecting one or more physical resource blocks from a set of physical resource blocks of the sidelink feedback channel based on the index. In some examples, to support selecting the resource of the sidelink feedback channel, the cyclic shift component 740 may be configured as or otherwise support a means for selecting, from a set of orthogonal cyclic shifts, a cyclic shift to be associated with the sub-slot based on the index.

In some examples, to support selecting the resource of the sidelink feedback channel, the cyclic shift component 740 may be configured as or otherwise support a means for associating a first cyclic shift with each sub-slot included in the slot.

In some examples, the resource availability determination component 750 may be configured as or otherwise support a means for determining a number of available physical resource blocks in a period of periodic feedback resources, where the number of available physical resource blocks is a multiple of the product of a number of sub-slots in the period and a number of subchannels of the sidelink data channel.

Figure 8:
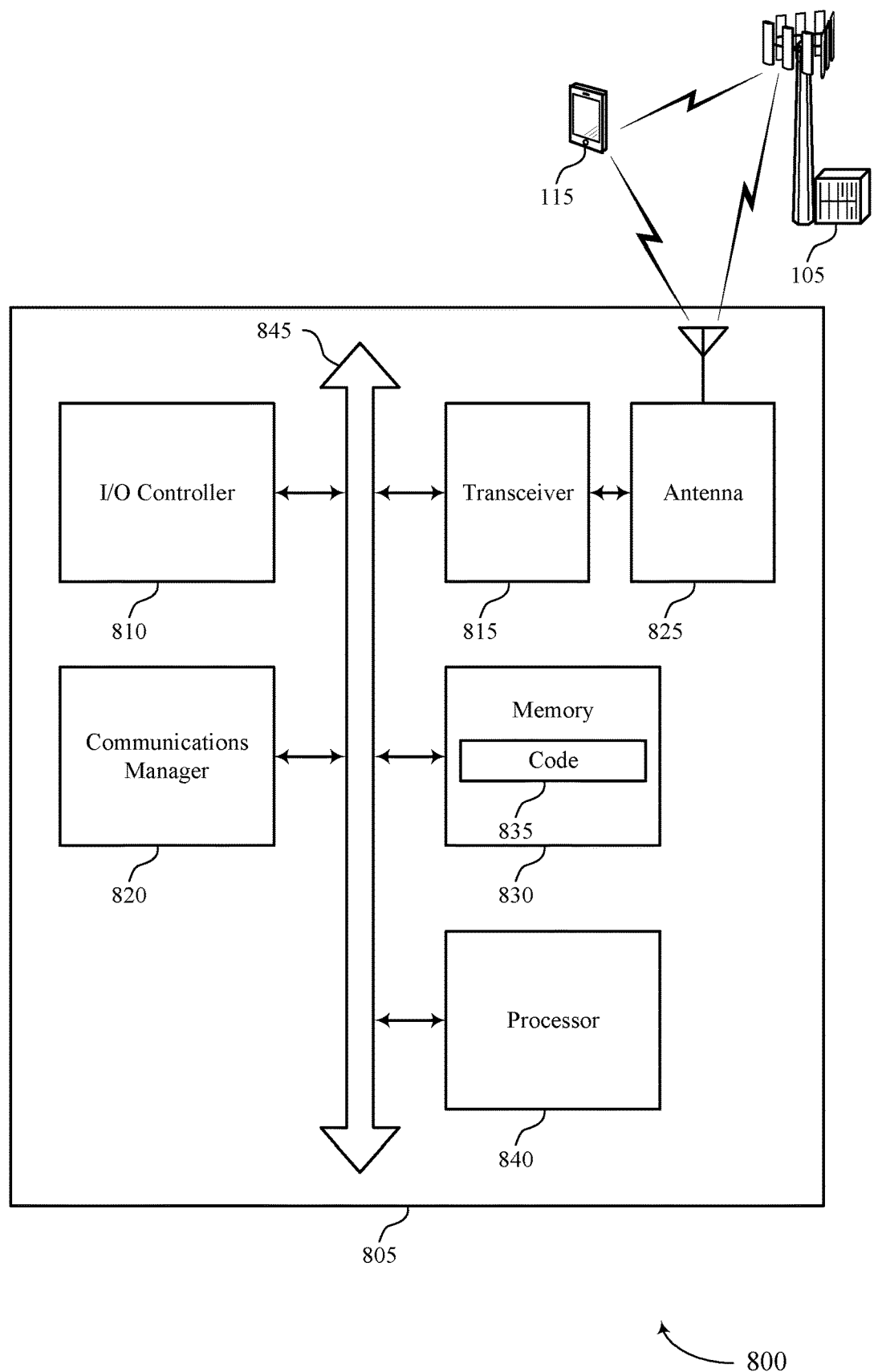
FIG. 8 shows a diagram of a system including a device that supports feedback designs for sidelink sub-slots in accordance with aspects of the present disclosure.

FIG. 8 shows a diagram of a system 800 including a device 805 that supports feedback designs for sidelink sub-slots in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a GPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting feedback designs for sidelink sub-slots). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving a first data message in a sub-slot of a slot and in a sub-channel of a sidelink data channel. The communications manager 820 may be configured as or otherwise support a means for selecting a resource of a sidelink feedback channel based on a first index associated with the slot and a second index associated with the sub-slot within one or more slots including the slot. The communications manager 820 may be configured as or otherwise support a means for transmitting a feedback message associated with the first data message according to the selected resource.

Additionally or alternatively, the communications manager 820 may support wireless communications at a UE in accordance with examples as disclosed herein. For example, the communications manager 820 may be configured as or otherwise support a means for receiving a first data message in a sub-slot of a slot and in a sub-channel of a sidelink data channel. The communications manager 820 may be configured as or otherwise support a means for selecting a resource of a sidelink feedback channel from periodic resources having a slot-based periodicity based on an index associated with the sub-slot within one or more slots including the slot. The communications manager 820 may be configured as or otherwise support a means for transmitting a feedback message associated with the first data message in the resource based on the selecting.

By including or configuring the communications manager 820 in accordance with examples as described herein, the device 805 may support techniques for improved communication reliability, reduced latency, improved user experience related to reduced processing, reduced power consumption, more efficient utilization of communication resources, improved coordination between devices, longer battery life, improved utilization of processing capability, or a combination thereof.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of feedback designs for sidelink sub-slots as described herein, or the processor 840 and the memory 830 may be otherwise configured to perform or support such operations.

Figure 9:
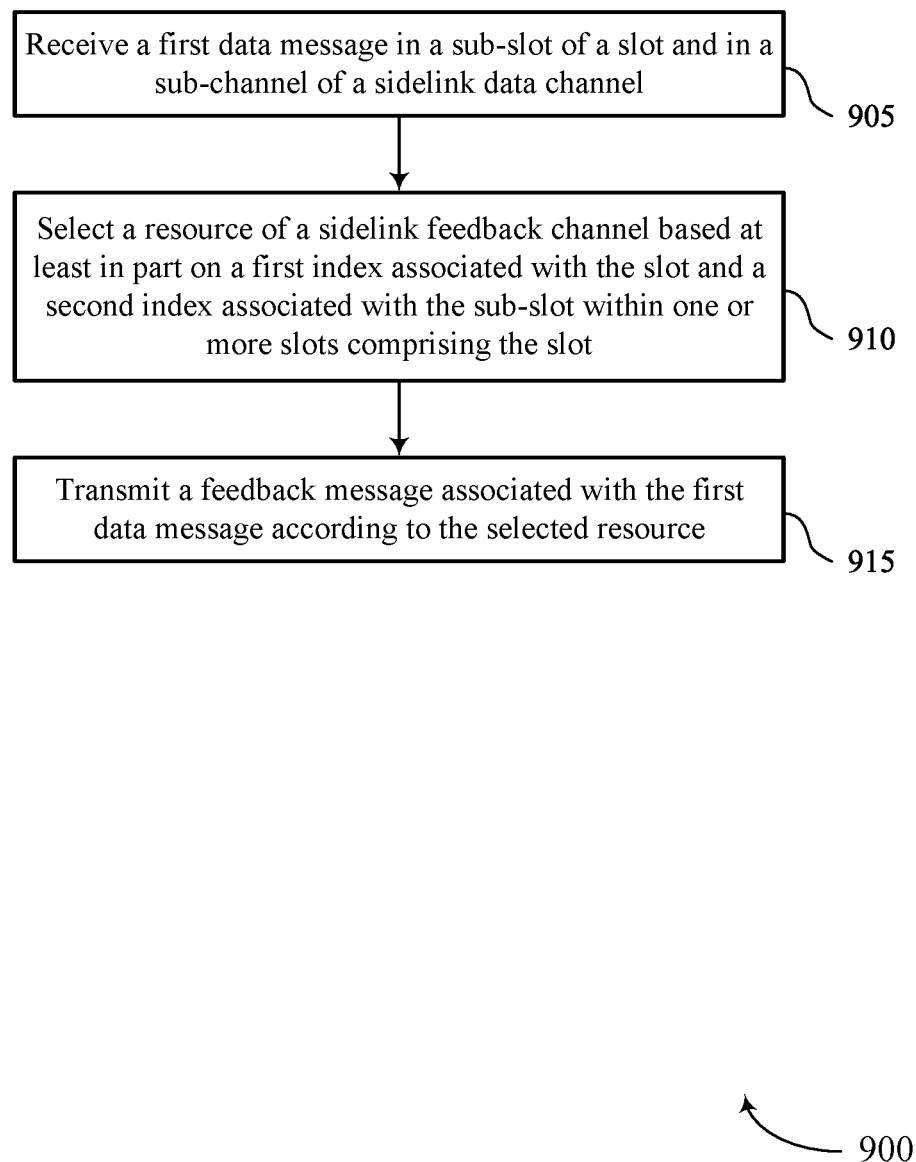
FIGS. 9 through 12 show flowcharts illustrating methods that support feedback designs for sidelink sub-slots in accordance with aspects of the present disclosure.

FIG. 9 shows a flowchart illustrating a method 900 that supports feedback designs for sidelink sub-slots in accordance with aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 905, the method may include receiving a first data message in a sub-slot of a slot and in a sub-channel of a sidelink data channel. The operations of 905 may be performed in accordance with examples as disclosed herein. In some examples, aspects of the operations of 905 may be performed by a data message reception component 725 as described with reference to FIG. 7.

At 910, the method may include selecting a resource of a sidelink feedback channel based on a first index associated with the slot and a second index associated with the sub-slot within one or more slots including the slot. The operations of 910 may be performed in accordance with examples as disclosed herein. In some examples, aspects of the operations of 910 may be performed by a resource selection component 730 as described with reference to FIG. 7.

At 915, the method may include transmitting a feedback message associated with the first data message according to the selected resource. The operations of 915 may be performed in accordance with examples as disclosed herein. In some examples, aspects of the operations of 915 may be performed by a feedback message transmission component 735 as described with reference to FIG. 7.

Figure 10:
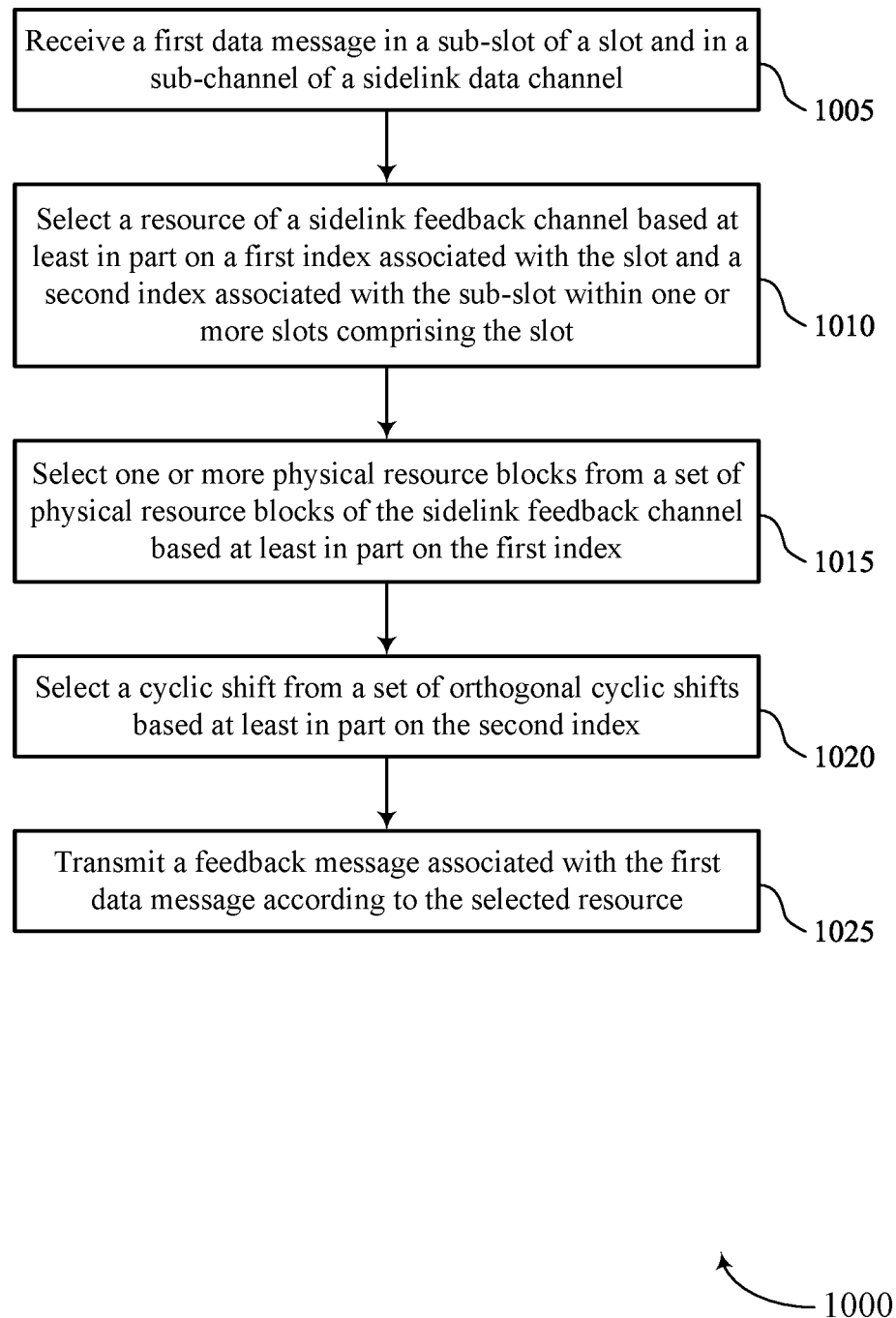

FIG. 10 shows a flowchart illustrating a method 1000 that supports feedback designs for sidelink sub-slots in accordance with aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1005, the method may include receiving a first data message in a sub-slot of a slot and in a sub-channel of a sidelink data channel. The operations of 1005 may be performed in accordance with examples as disclosed herein. In some examples, aspects of the operations of 1005 may be performed by a data message reception component 725 as described with reference to FIG. 7.

At 1010, the method may include selecting a resource of a sidelink feedback channel based on a first index associated with the slot and a second index associated with the sub-slot within one or more slots including the slot. The operations of 1010 may be performed in accordance with examples as disclosed herein. In some examples, aspects of the operations of 1010 may be performed by a resource selection component 730 as described with reference to FIG. 7.

At 1015, the method may include selecting one or more physical resource blocks from a set of physical resource blocks of the sidelink feedback channel based on the first index. The operations of 1015 may be performed in accordance with examples as disclosed herein. In some examples, aspects of the operations of 1015 may be performed by a resource selection component 730 as described with reference to FIG. 7.

At 1020, the method may include selecting a cyclic shift from a set of orthogonal cyclic shifts based on the second index. The operations of 1020 may be performed in accordance with examples as disclosed herein. In some examples, aspects of the operations of 1020 may be performed by a cyclic shift component 740 as described with reference to FIG. 7.

At 1025, the method may include transmitting a feedback message associated with the first data message according to the selected resource. The operations of 1025 may be performed in accordance with examples as disclosed herein. In some examples, aspects of the operations of 1025 may be performed by a feedback message transmission component 735 as described with reference to FIG. 7.

Figure 11:
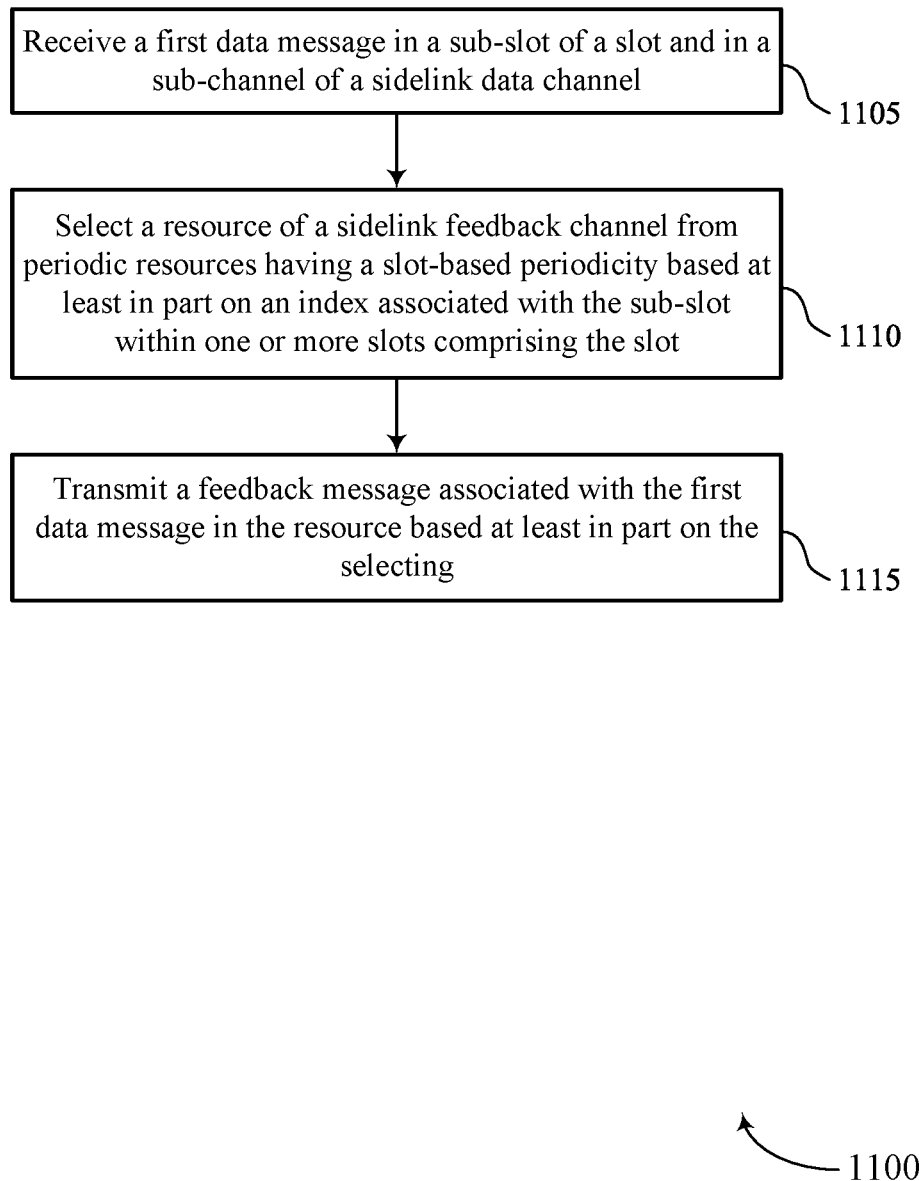

FIG. 11 shows a flowchart illustrating a method 1100 that supports feedback designs for sidelink sub-slots in accordance with aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1105, the method may include receiving a first data message in a sub-slot of a slot and in a sub-channel of a sidelink data channel. The operations of 1105 may be performed in accordance with examples as disclosed herein. In some examples, aspects of the operations of 1105 may be performed by a data message reception component 725 as described with reference to FIG. 7.

At 1110, the method may include selecting a resource of a sidelink feedback channel from periodic resources having a slot-based periodicity based on an index associated with the sub-slot within one or more slots including the slot. The operations of 1110 may be performed in accordance with examples as disclosed herein. In some examples, aspects of the operations of 1110 may be performed by a resource selection component 730 as described with reference to FIG. 7.

At 1115, the method may include transmitting a feedback message associated with the first data message in the resource based on the selecting. The operations of 1115 may be performed in accordance with examples as disclosed herein. In some examples, aspects of the operations of 1115 may be performed by a feedback message transmission component 735 as described with reference to FIG. 7.

Figure 12:
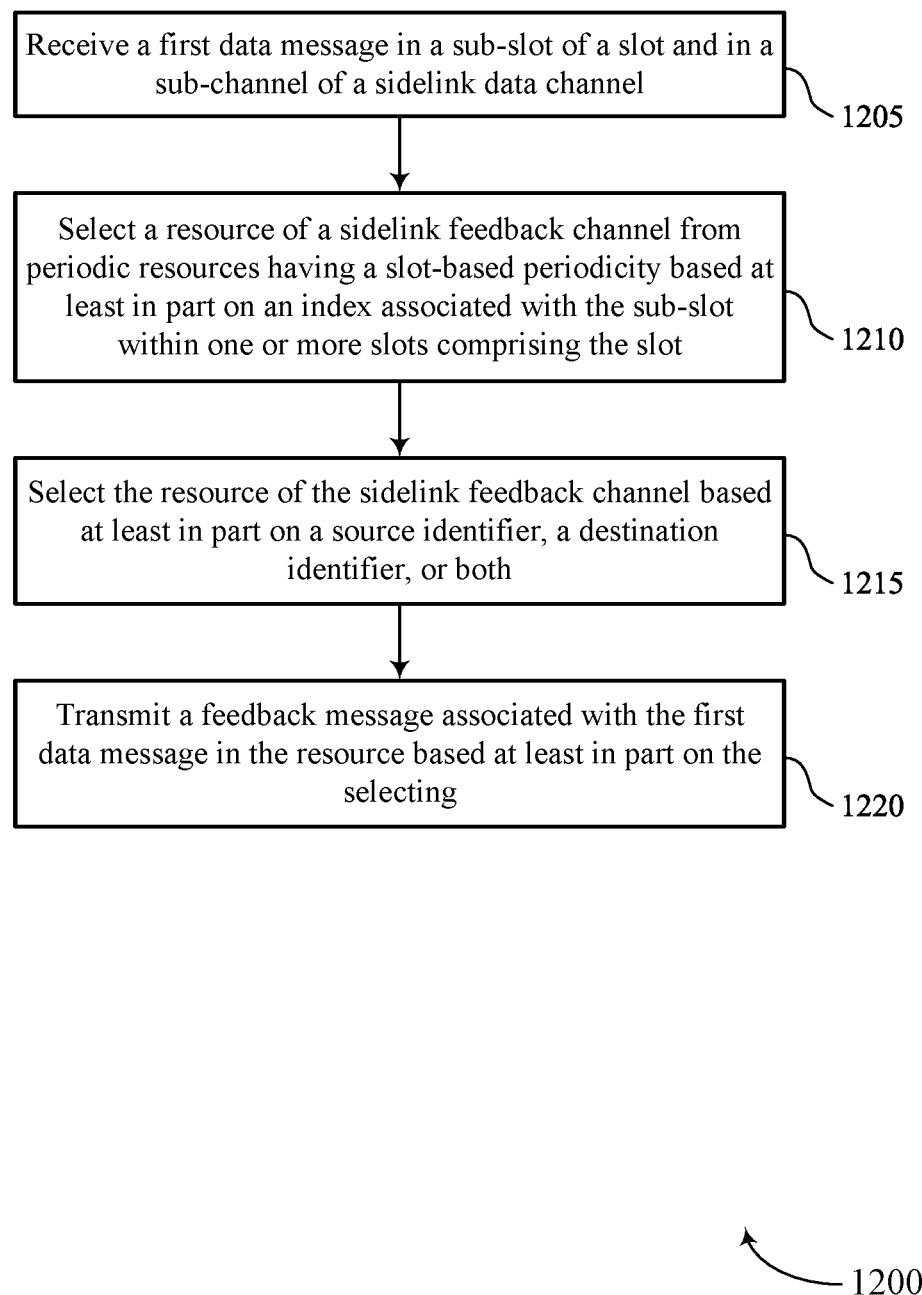

FIG. 12 shows a flowchart illustrating a method 1200 that supports feedback designs for sidelink sub-slots in accordance with aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1205, the method may include receiving a first data message in a sub-slot of a slot and in a sub-channel of a sidelink data channel. The operations of 1205 may be performed in accordance with examples as disclosed herein. In some examples, aspects of the operations of 1205 may be performed by a data message reception component 725 as described with reference to FIG. 7.

At 1210, the method may include selecting a resource of a sidelink feedback channel from periodic resources having a slot-based periodicity based on an index associated with the sub-slot within one or more slots including the slot. The operations of 1210 may be performed in accordance with examples as disclosed herein. In some examples, aspects of the operations of 1210 may be performed by a resource selection component 730 as described with reference to FIG. 7.

At 1215, the method may include selecting the resource of the sidelink feedback channel based on a source identifier, a destination identifier, or both. The operations of 1215 may be performed in accordance with examples as disclosed herein. In some examples, aspects of the operations of 1215 may be performed by a resource selection component 730 as described with reference to FIG. 7.

At 1220, the method may include transmitting a feedback message associated with the first data message in the resource based on the selecting. The operations of 1220 may be performed in accordance with examples as disclosed herein. In some examples, aspects of the operations of 1220 may be performed by a feedback message transmission component 735 as described with reference to FIG. 7.

The following provides an overview of aspects of the present disclosure:

Aspect 1: A method for wireless communications at a UE, comprising: receiving a first data message in a sub-slot of a slot and in a sub-channel of a sidelink data channel; selecting a resource of a sidelink feedback channel based at least in part on a first index associated with the slot and a second index associated with the sub-slot within one or more slots comprising the slot; and transmitting a feedback message associated with the first data message according to the selected resource.

Aspect 2: The method of aspect 1, wherein selecting the resource of the sidelink feedback channel comprises: selecting, based at least in part on the second index, one or more physical resource blocks from a set of physical resource blocks of the sidelink feedback channel associated with the first index and the sub-channel.

Aspect 3: The method of aspect 2, wherein selecting the resource of the sidelink feedback channel comprises: selecting the resource of the sidelink feedback channel based at least in part on a source identifier, a destination identifier, or both.

Aspect 4: The method of any of aspects 2 through 3, wherein selecting the resource of the sidelink feedback channel further comprises: associating a first cyclic shift with each sub-slot comprised in the slot.

Aspect 5: The method of any of aspects 1 through 4, wherein selecting the resource of the sidelink feedback channel comprises: selecting one or more physical resource blocks from a set of physical resource blocks of the sidelink feedback channel based at least in part on the first index; and selecting a cyclic shift from a set of orthogonal cyclic shifts based at least in part on the second index.

Aspect 6: The method of any of aspects 1 through 5, further comprising: receiving a second data message in a second sub-slot, wherein the second sub-slot is associated with a third index and both the first data message and the second data message are associated with a single transport block; wherein transmitting the feedback message comprises transmitting a positive acknowledgement or a negative acknowledgement associated with both the first data message and the second data message.

Aspect 7: A method for wireless communications at a UE, comprising: receiving a first data message in a sub-slot of a slot and in a sub-channel of a sidelink data channel; selecting a resource of a sidelink feedback channel from periodic resources having a slot-based periodicity based at least in part on an index associated with the sub-slot within one or more slots comprising the slot; and transmitting a feedback message associated with the first data message in the resource based at least in part on the selecting.

Aspect 8: The method of aspect 7, wherein selecting the resource of the sidelink feedback channel comprises: selecting the resource of the sidelink feedback channel based at least in part on a source identifier, a destination identifier, or both.

Aspect 9: The method of any of aspects 7 through 8, further comprising: associating a first cyclic shift with the resource of the sidelink feedback channel, wherein transmitting the feedback message is based at least in part on the first cyclic shift.

Aspect 10: The method of any of aspects 7 through 9, further comprising: receiving a second data message in a second sub-slot, wherein the second sub-slot is associated with a second index and both the first data message and the second data message are associated with a single transport block; wherein transmitting the feedback message comprises transmitting a positive acknowledgement or a negative acknowledgement associated with both the first data message and the second data message.

Aspect 11: The method of any of aspects 7 through 10, wherein selecting the resource of the sidelink feedback channel comprises: selecting one or more physical resource blocks from a set of physical resource blocks of the sidelink feedback channel based at least in part on the index; and selecting, from a set of orthogonal cyclic shifts, a cyclic shift to be associated with the sub-slot based at least in part on the index.

Aspect 12: The method of aspect 11, wherein selecting the resource of the sidelink feedback channel further comprises: associating a first cyclic shift with each sub-slot comprised in the slot.

Aspect 13: The method of any of aspects 7 through 12, further comprising: determining a number of available physical resource blocks in a period of periodic feedback resources, wherein the number of available physical resource blocks is a multiple of the product of a number of sub-slots in the period and a number of subchannels of the sidelink data channel.

Aspect 14: An apparatus for wireless communications at a UE, comprising a processor; memory coupled with the processor; and instructions stored in the memory and executable by the processor to cause the UE to perform a method of any of aspects 1 through 6.

Aspect 15: An apparatus for wireless communications at a UE, comprising at least one means for performing a method of any of aspects 1 through 6.

Aspect 16: A non-transitory computer-readable medium storing code for wireless communications at a UE, the code comprising instructions executable by a processor to perform a method of any of aspects 1 through 6.

Aspect 17: An apparatus for wireless communications at a UE, comprising a processor; memory coupled with the processor; and instructions stored in the memory and executable by the processor to cause the UE to perform a method of any of aspects 7 through 13.

Aspect 18: An apparatus for wireless communications at a UE, comprising at least one means for performing a method of any of aspects 7 through 13.

Aspect 19: A non-transitory computer-readable medium storing code for wireless communications at a UE, the code comprising instructions executable by a processor to perform a method of any of aspects 7 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies, including future systems and radio technologies, not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, a GPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, phase change memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving a first data message in a sub-slot of a slot and in a sub-channel of a sidelink data channel;
   selecting a resource of a sidelink feedback channel based at least in part on a slot index associated with the slot, a sub-slot index associated with the sub-slot, and a cyclic selection factor, the sub-slot index comprised in a plurality of sub-slot indices corresponding with one or more slots comprising the slot, wherein selecting the resource of the sidelink feedback channel comprises selecting, based at least in part on the sub-slot index and the cyclic selection factor, one or more physical resource blocks from a set of physical resource blocks of the sidelink feedback channel associated with the slot index and the sub-channel; and
   transmitting a feedback message associated with the first data message according to the selected resource.

2. The method of claim 1, wherein selecting the resource of the sidelink feedback channel further comprises:
   selecting the resource of the sidelink feedback channel based at least in part on a source identifier, a destination identifier, or both.

3. The method of claim 1, wherein selecting the resource of the sidelink feedback channel further comprises:
   associating a first cyclic shift with each sub-slot comprised in the slot.

4. The method of claim 1, wherein selecting the resource of the sidelink feedback channel further comprises:
   selecting the one or more physical resource blocks from the set of physical resource blocks of the sidelink feedback channel based at least in part on the slot index; and
   selecting a cyclic shift from a set of orthogonal cyclic shifts based at least in part on the sub-slot index.

5. The method of claim 1, further comprising:
   receiving a second data message in a second sub-slot, wherein the second sub-slot is associated with a third index and both the first data message and the second data message are associated with a single transport block;
   wherein transmitting the feedback message comprises transmitting a positive acknowledgement or a negative acknowledgement associated with both the first data message and the second data message.

6. A method for wireless communications at a user equipment (UE), comprising:
   receiving a first data message in a sub-slot of a slot and in a sub-channel of a sidelink data channel;
   selecting a resource of a sidelink feedback channel from periodic resources having a slot-based periodicity based at least in part on a sub-slot index associated with the sub-slot and a cyclic selection factor, the sub-slot index comprised in a plurality of sub-slot indices corresponding with one or more slots comprising the slot, wherein selecting the resource of the sidelink feedback channel comprises selecting, based at least in part on the sub-slot index and the cyclic selection factor, one or more physical resource blocks from a set of physical resource blocks of the sidelink feedback channel; and
transmitting a feedback message associated with the first data message in the resource based at least in part on the selecting.

7. The method of claim 6, wherein selecting the resource of the sidelink feedback channel further comprises:
selecting the resource of the sidelink feedback channel based at least in part on a source identifier, a destination identifier, or both.

8. The method of claim 6, further comprising:
associating a first cyclic shift with the resource of the sidelink feedback channel, wherein transmitting the feedback message is based at least in part on the first cyclic shift.

9. The method of claim 6, further comprising:
receiving a second data message in a second sub-slot, wherein the second sub-slot is associated with a second index and both the first data message and the second data message are associated with a single transport block;
wherein transmitting the feedback message comprises transmitting a positive acknowledgement or a negative acknowledgement associated with both the first data message and the second data message.

10. The method of claim 6, wherein selecting the resource of the sidelink feedback channel comprises:
selecting, from a set of orthogonal cyclic shifts, a cyclic shift to be associated with the sub-slot based at least in part on the sub-slot index.

11. The method of claim 10, wherein selecting the resource of the sidelink feedback channel further comprises:
associating a first cyclic shift with each sub-slot comprised in the slot.

12. The method of claim 6, further comprising:
determining a number of available physical resource blocks in a period of periodic feedback resources, wherein the number of available physical resource blocks is a multiple of a product of a number of sub-slots in the period and a number of subchannels of the sidelink data channel.

13. An apparatus for wireless communications at a user equipment (UE), comprising:
at least one processor; and
memory coupled to the at least one processor, the memory storing instructions executable by the at least one processor to cause the UE to:
receive a first data message in a sub-slot of a slot and in a sub-channel of a sidelink data channel;
select a resource of a sidelink feedback channel based at least in part on a slot index associated with the slot, a sub-slot index associated with the sub-slot, and a cyclic selection factor, the sub-slot index comprised in a plurality of sub-slot indices corresponding with one or more slots comprising the slot, wherein selection of the resource of the sidelink feedback channel is based at least in part on the sub-slot index and the cyclic selection factor, one or more physical resource blocks from a set of physical resource blocks of the sidelink feedback channel associated with the slot index and the sub-channel; and
transmit a feedback message associated with the first data message according to the selected resource.

14. The apparatus of claim 13, wherein the instructions to select the resource of the sidelink feedback channel are executable by the at least one processor to cause the UE to:
select the resource of the sidelink feedback channel based at least in part on a source identifier, a destination identifier, or both.

15. The apparatus of claim 13, wherein the instructions to select the resource of the sidelink feedback channel are executable by the at least one processor to cause the UE to:
associate a first cyclic shift with each sub-slot comprised in the slot.

16. The apparatus of claim 13, wherein the instructions to select the resource of the sidelink feedback channel are executable by the at least one processor to cause the UE to:
select the one or more physical resource blocks from the set of physical resource blocks of the sidelink feedback channel based at least in part on the slot index; and
select a cyclic shift from a set of orthogonal cyclic shifts based at least in part on the sub-slot index.

17. The apparatus of claim 13, wherein the instructions are further executable by the at least one processor to cause the UE to:
receive a second data message in a second sub-slot, wherein the second sub-slot is associated with a third index and both the first data message and the second data message are associated with a single transport block;
wherein the instructions to transmit the feedback message are further executable by the at least one processor to cause the UE to transmit a positive acknowledgement or a negative acknowledgement associated with both the first data message and the second data message.

18. An apparatus for wireless communications at a user equipment (UE), comprising:
at least one processor; and
memory coupled to the at least one processor, the memory storing instructions executable by the at least one processor to cause the UE to:
receive a first data message in a sub-slot of a slot and in a sub-channel of a sidelink data channel;
select a resource of a sidelink feedback channel from periodic resources having a slot-based periodicity based at least in part on sub-slot index associated with the sub-slot and a cyclic selection factor, the sub-slot index comprised in a plurality of sub-slot indices corresponding with one or more slots comprising the slot, wherein selection of the resource of the sidelink feedback channel is based at least in part on the sub-slot index, one or more physical resource blocks from a set of physical resource blocks of the sidelink feedback channel; and
transmit a feedback message associated with the first data message in the resource based at least in part on the selection.

19. The apparatus of claim 18, wherein the instructions to select the resource of the sidelink feedback channel are executable by the at least one processor to cause the UE to:
select the resource of the sidelink feedback channel based at least in part on a source identifier, a destination identifier, or both.

20. The apparatus of claim 18, wherein the instructions are further executable by the at least one processor to cause the UE to:
associate a first cyclic shift with the resource of the sidelink feedback channel, wherein transmitting the feedback message is based at least in part on the first cyclic shift.

21. The apparatus of claim 18, wherein the instructions are further executable by the at least one processor to cause the UE to:

receive a second data message in a second sub-slot, wherein the second sub-slot is associated with a second index and both the first data message and the second data message are associated with a single transport block;

wherein transmit the feedback message comprises transmitting a positive acknowledgement or a negative acknowledgement associated with both the first data message and the second data message.

22. The apparatus of claim 18, wherein the instructions to select the resource of the sidelink feedback channel are executable by the at least one processor to cause the UE to:

select, from a set of orthogonal cyclic shifts, a cyclic shift to be associated with the sub-slot based at least in part on the sub-slot index.

23. The apparatus of claim 22, wherein the instructions to select the resource of the sidelink feedback channel are further executable by the at least one processor to cause the UE to:

associate a first cyclic shift with each sub-slot comprised in the slot.

24. The apparatus of claim 18, wherein the instructions are further executable by the at least one processor to cause the UE to:

determine a number of available physical resource blocks in a period of periodic feedback resources, wherein the number of available physical resource blocks is a multiple of a product of a number of sub-slots in the period and a number of subchannels of the sidelink data channel.

\* \* \* \* \*